(12) United States Patent
Brechtel et al.

(10) Patent No.: US 9,987,587 B2
(45) Date of Patent: Jun. 5, 2018

(54) METHOD AND DEVICE FOR THE TREATMENT OF A GAS STREAM, IN PARTICULAR FOR THE TREATMENT OF A NATURAL GAS STREAM

(71) Applicant: Siemens Aktiengesellschaft, Munich (DE)

(72) Inventors: Kevin Brechtel, Uehlfeld (DE); Bjorn Fischer, Dusseldorf (DE); Rudiger Schneider, Eppstein (DE); Henning Schramm, Frankfurt am Main (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 476 days.

(21) Appl. No.: 14/767,320

(22) PCT Filed: Feb. 3, 2014

(86) PCT No.: PCT/EP2014/051992
§ 371 (c)(1),
(2) Date: Aug. 12, 2015

(87) PCT Pub. No.: WO2014/127976
PCT Pub. Date: Aug. 28, 2014

(65) Prior Publication Data
US 2016/0008755 A1    Jan. 14, 2016

(30) Foreign Application Priority Data
Feb. 19, 2013    (DE) .......................... 10 2013 202 597

(51) Int. Cl.
*C10L 3/10* (2006.01)
*B01D 53/74* (2006.01)
(Continued)

(52) U.S. Cl.
CPC ..... *B01D 53/1468* (2013.01); *B01D 53/1425* (2013.01); *B01D 53/1475* (2013.01);
(Continued)

(58) Field of Classification Search
CPC .. C10L 3/10; C10L 3/101; C10L 3/102; C10L 3/103; C10L 3/104; B01D 53/74; B01D 53/75; B01D 53/78
See application file for complete search history.

(56) References Cited

U.S. PATENT DOCUMENTS 4,999,031 A    3/1991    Gerhardt et al.
5,797,981 A *  8/1998    Collin ................ B01D 53/1456
                                                    95/174

(Continued)

FOREIGN PATENT DOCUMENTS

CN    1652861 A    8/2005
DE    3828227 A    2/1990
(Continued)

*Primary Examiner* — Timothy C Vanoy
(74) *Attorney, Agent, or Firm* — Beusse Wolter Sanks & Maire

(57) ABSTRACT

A method for the treatment of a gas stream, wherein before the combustion of the gas stream, hydrogen sulfide is separated out of the gas stream in a first absorber by an absorption medium, the treated gas stream purified of hydrogen sulfide is burnt in a combustion apparatus, the carbon dioxide contained in the exhaust gas of the burnt gas stream after combustion is separated in a second absorber by an absorption medium, and the separated hydrogen sulfide and carbon dioxide are separated in at least one desorber from the absorption medium for the regeneration of the latter. The same absorption medium separates the hydrogen sulfide out of the gas stream and the carbon dioxide out of the exhaust gas. A corresponding device for the treatment of a gas stream (Continued)

has a first absorber and a second absorber flow-connected to one another for the exchange of absorption medium.

16 Claims, 3 Drawing Sheets

(51) Int. Cl.
  *B01D 53/75*  (2006.01)
  *B01D 53/78*  (2006.01)
  *B01D 53/14*  (2006.01)
  *B01D 53/18*  (2006.01)
  *F02C 3/04*  (2006.01)
  *F02C 7/22*  (2006.01)
  *F23J 7/00*  (2006.01)
  *F23J 15/04*  (2006.01)
  *F23R 3/40*  (2006.01)
  *B01D 53/34*  (2006.01)

(52) U.S. Cl.
  CPC ............ *B01D 53/18* (2013.01); *C10L 3/103* (2013.01); *C10L 3/104* (2013.01); *F02C 3/04* (2013.01); *F02C 7/22* (2013.01); *F23J 7/00* (2013.01); *F23J 15/04* (2013.01); *F23R 3/40* (2013.01); *B01D 53/343* (2013.01); *B01D 2252/204* (2013.01); *B01D 2252/20421* (2013.01); *B01D 2252/20426* (2013.01); *B01D 2252/20431* (2013.01); *B01D 2252/20436* (2013.01); *B01D 2252/20494* (2013.01); *B01D 2256/245* (2013.01); *B01D 2257/302* (2013.01); *B01D 2257/304* (2013.01); *B01D 2257/504* (2013.01); *B01D 2258/0283* (2013.01); *B01D 2259/65* (2013.01); *F05D 2220/32* (2013.01); *F05D 2240/35* (2013.01); *Y02C 10/06* (2013.01); *Y02E 20/326* (2013.01)

(56) References Cited

U.S. PATENT DOCUMENTS

| | | | |
|---|---|---|---|
| 9,731,974 | B2 * | 8/2017 | Weiss ..................... C01B 32/50 |
| 2004/0035147 | A1 | 2/2004 | Iijima |
| 2005/0103194 | A1 * | 5/2005 | Huder ................ B01D 53/1406 |
| | | | 95/235 |
| 2006/0117954 | A1 | 6/2006 | Versteeg |
| 2008/0078294 | A1 | 3/2008 | Adamopoulos |
| 2013/0174566 | A1 | 7/2013 | Birley et al. |

FOREIGN PATENT DOCUMENTS

| | | |
|---|---|---|
| DE | 102010041536 A1 | 3/2012 |
| EP | 2105191 A1 | 9/2009 |
| FR | 2951385 A1 | 4/2011 |
| WO | 2012052262 A1 | 4/2012 |

\* cited by examiner

US 9,987,587 B2

METHOD AND DEVICE FOR THE TREATMENT OF A GAS STREAM, IN PARTICULAR FOR THE TREATMENT OF A NATURAL GAS STREAM

CROSS REFERENCE TO RELATED APPLICATIONS

This application is the US National Stage of International Application No. PCT/EP2014/051992 filed Feb. 3, 2014, and claims the benefit thereof. The International Application claims the benefit of German Application No. DE 102013202597.1 filed Feb. 19, 2013. All of the applications are incorporated by reference herein in their entirety.

FIELD OF INVENTION

The invention relates to a method for the treatment of a gas stream and, in particular, for the treatment of a natural gas stream. The invention relates, furthermore, to a device for carrying out a corresponding method.

BACKGROUND OF INVENTION

Natural gas is a fossil fuel with a low output of carbon dioxide ($CO_2$) and with a low emission of waste products during combustion. Its contribution as one of the most important world energy resources rises continually. Against the background of a shortage of raw materials and of the constantly growing demand for energy and for reasons of environmental protection, the treatment and utilization of natural gas therefore afford a very promising possibility for the efficient and low-emission generation of energy.

However, the direct utilization of crude natural gas has hitherto been possible to only a limited extent. On account of the acid constituents of a natural gas stream, such as, in particular, hydrogen sulfide ($H_2S$), these often cannot be used directly in a gas turbine or for pipeline transport. Acid natural gas streams are therefore for the most part burnt off, unused.

Alternatively to this, attempts are made to treat natural gas for further utilization by means of various separation techniques. For this purpose, physical or chemical absorption media are employed in order to ensure that natural gas has the purities required for further use. In general, however, in this case only the fraction of hydrogen sulfide and of carbon dioxide in the crude natural gas is separated off and recovered. The $CO_2$ contained in the exhaust gas occurring during subsequent combustion or the $SO_2$ obtained from the hydrogen sulfide during combustion is frequently left unused.

So that the components contained in the exhaust gas or in what is known as flue gas can also be separated off and utilized, for example, before combustion, the hydrogen sulfide is first removed from the crude natural gas and carbon dioxide contained in the flue gas is separated off in a method carried out after combustion. However, two methods separate from one another and the corresponding techniques are necessary for this purpose, as a result of which the investment costs for a new construction and/or for the retrofitting of existing plants are high.

SUMMARY OF INVENTION

A first object of the invention, therefore, is to specify a cost-effective alternative, simplified in relation to current treatment methods, for the treatment of a gas stream and, in particular, of an acid natural gas stream and for the corresponding utilization of products which in this case occur.

A second object of the invention is to specify a device, by means of which a correspondingly optimized method can be carried out.

The first object of the invention is achieved, according to the invention, by means of a method for the treatment of a gas stream, in particular for the treatment of a natural gas stream. In this method, before the combustion of the gas stream, hydrogen sulfide is separated out of the gas stream in a first absorber by means of an absorption medium, the treated gas stream purified of hydrogen sulfide is burnt in a combustion apparatus, carbon dioxide contained in the exhaust gas of the burnt gas stream is separated in a second absorber by means of an absorption medium, and the separated hydrogen sulfide and the separated carbon dioxide are separated from the absorption medium in at least one desorber for the regeneration of the absorption medium. In this case, the same absorption medium is used for separating the hydrogen sulfide out of the gas stream and for separating the carbon dioxide out of the exhaust gas.

The invention in this case proceeds from the consideration that the utilization of natural gas streams is a very promising possibility for the efficient and low-emission utilization of energy. The major challenge in the treatment of crude natural gas streams is the fraction of acid gases which often complicates or in the most adverse case even prevents the direct utilization of the gas streams. Acid natural gas streams are therefore frequently burnt off, unused, or have to be treated by means of costly techniques involving a high outlay.

In this respect, the invention recognizes that it is possible to generate a usable gas stream from a natural gas stream, in particular with a high fraction of acid components, if the same absorption medium is employed to separate hydrogen sulfide out of the gas stream before combustion and to separate carbon dioxide contained in the exhaust gas of the burnt gas stream after combustion.

The absorption medium in this case performs both separation tasks, that is to say it is suitable for separating by absorption the hydrogen sulfide out of the crude natural gas stream before combustion (pre-combustion capture) and likewise the carbon dioxide out of the flue gas after combustion (post-combustion capture). Since only one absorption medium is used, costs can be saved in terms of the quantity of absorption medium required. Furthermore, the treatment of natural gas can be implemented at low outlay in terms of process technology and also with only a small additional space requirement. It is possible to integrate the method into existing process chains.

The absorption medium employed is such that it absorbs both the hydrogen sulfide and the carbon dioxide, the absorption of both components taking place essentially in two absorbers which are separate from one another and are flow-connected to one another, in order to ensure an exchange of the absorption medium.

Furthermore, in addition to the absorption of the $CO_2$ occurring during combustion in the second absorber, the $CO_2$ already contained in the natural gas before combustion can also be absorbed by the absorption medium in the first absorber. The same applies correspondingly to $H_2S$ or $SO_2/SO_x$ which has possibly remained in the gas stream. $H_2S$ can basically still be absorbed by the absorption medium even after combustion and, as a result of subsequent desorption from the absorption medium, can be delivered to further process steps. $SO_2/SO_x$ can be precipitated, for example, in the form of potassium sulfate. This takes place, for example, in a reclaimer in which the absorption medium is treated and purified.

In other words, by the combined pre-combustion and post-combustion treatment of crude natural gas streams, virtually complete retention of the carbon and sulfur load introduced by the natural gas is possible in a joint process, so that natural gas streams which hitherto it has been scarcely possible or possible only to a limited extent to utilize can be utilized virtually completely.

Thus, by virtue of the method, the raw materials (carbon as $CO_2$ and sulfur as $H_2S$ or $SO_2$) contained in hitherto scarcely utilized natural gas streams can be obtained, undesirable emissions harmful to climate being largely avoided, can be stored and/or can be converted into desired products.

The acid natural gas stream is introduced, for treatment before combustion, via a delivery line into the lower part of a first absorber ($H_2S$ absorber), in particular in the form of an absorber column. By the hydrogen sulfide being absorbed in the absorption medium located in the absorber, the hydrogen sulfide and also any $CO_2$ present are absorbed. As a result, in particular, the $H_2S$ level in the gas stream is lowered, with the result that irreparable damage, such as, for example, corrosion, to the combustion apparatus can be avoided.

Combustion itself takes place in a combustion unit, in particular in a gas turbine, usable energy being obtained by combustion from the gas stream purified of hydrogen sulfide. The exhaust gas, that is to say flue gas, occurring during combustion in the combustion apparatus is virtually free of sulfur-containing components.

The exhaust gas after combustion, that is to say the flue gas, is fed into a second absorber ($CO_2$ absorber), which, in particular, is part of a current $CO_2$ separation device. In order to promote the absorption process there, the flue gas is usually cooled, before entering the absorber, in what is known as a flue gas cooler. The conditions for the absorption of $CO_2$ in the absorption medium within the $CO_2$ absorber are thereby improved, since the solubility of $CO_2$ increases with the falling temperature.

Both the $H_2S$ contained in the crude natural gas before combustion and the $CO_2$ contained in the flue gas after combustion are washed out of the respective gas stream in the conventional way by an absorption/desorption process by means of a suitable absorption medium. For this purpose, the gas stream is brought into contact with the absorption medium in each case in a corresponding absorber and is absorbed or reversibly bound there. The hydrogen sulfide is absorbed within the first absorber (pre-combustion capture) in the same absorption medium which is also employed for treating the flue gas for carbon dioxide in the second absorber (post-combustion capture).

The crude natural gas stream purified before combustion and the purified flue gas are discharged from the respective absorbers, whereas the laden absorption medium of the first and/or of the second absorber is conducted into at least one desorber, along with a rise in temperature, in order to separate $H_2S$ and $CO_2$ and to regenerate the absorption medium. Separation in the desorber conventionally takes place thermally, that is to say $H_2S$ and $CO_2$ are desorbed and expelled by the supply of heat and can then be delivered for storage or utilization. Contained SOx is not expelled thermally, but instead is precipitated, for example, as potassium sulfate. This advantageously takes place in a reclaimer in which the absorption medium is treated and purified.

The regenerated absorption medium is recirculated from the desorber to the absorbers and is then available once again for the absorption of $H_2S$ before the combustion process and for the absorption of $CO_2$ after the combustion process.

The absorption media used for the absorption of carbon dioxide must usually, as far as possible, be largely free of sulfur dioxides, since they are generally deactivated by sulfur dioxides. Correspondingly, it is necessary for the flue gas to be virtually completely desulfurized prior to entry into a separation device for $CO_2$, before the flue gas comes into contact with the absorption medium there. This takes place as early as by the hydrogen sulfide being absorbed in the first absorber before combustion.

In an advantageous refinement of the invention, an amine-containing absorption medium is employed. In this case, expediently, an aqueous amine-containing solution is employed. An amine-containing absorption medium affords the desired conditions both for separating the hydrogen sulfide out of the crude natural gas stream before combustion and for separating the carbon dioxide out of the flue gas after combustion.

The amine-containing absorption medium may basically contain a single amine or a mixture of amines. Amines used may be primary amines, such as monoethanolamine or diglycolamine, secondary amines, such as diethanolamine or diisopropanolamine, and tertiary amines, such as methyldiethanolamines. Complex amines, such as sterically hindered or cyclic amines for carbamate formation, may likewise be employed.

Advantageously, further, an amino acid salt is used as absorption medium. In this case, too, it is expedient to use an aqueous amino acid salt solution. When an amino acid salt is used as absorption medium, it has proved advantageous to employ an amino acid salt which has a carbon substituent from the group containing hydrogen, an alkyl, a hydroxyalkyl or an aminoalkyl. Advantageously, further, an amino acid salt is used which has a nitrogen substituent from the group containing hydrogen, an alkyl, a hydroxyalkyl and a haloalkyl. Once again, a single amino acid salt, such as, for example, a potassium salt of glycine, or other amino acids may be used. Mixtures of various amino acid salts may also be used as absorption medium. Use of an amino acid salt also affords the advantage that desulfurization of the flue gas may be dispensed with.

In a further refinement, the amino acid salt is a salt of a metal, in particular of an alkali metal.

In particular, the desorption of the hydrogen sulfide and the desorption of the carbon dioxide out of the absorption medium take place in a common desorber. Already existing separation devices for $CO_2$ can consequently be used in order to desorb both hydrogen sulfide and carbon dioxide. Only the absorber for the absorption of $H_2S$ before the combustion of a natural gas stream has subsequently to be modified structurally.

In a further-advantageous refinement, the desorption of the hydrogen sulfide and the desorption of the carbon dioxide out of the absorption medium take place in each case in a separate desorber. Clean separation of the products from one another can thereby be ensured. Subsequent purification steps or undesirable reactions of the products are avoided virtually completely. So that, when two separate absorbers are used, it can be ensured that in each case essentially only $H_2S$ or essentially only $CO_2$ is desorbed in the desorbers, the desorption conditions within the respective desorbers are selected correspondingly. This may take place, in particular, by the targeted choice of the absorption medium and/or the temperature within the respective desorber.

The second object of the invention is achieved, according to the invention, by means of a device for the treatment of a gas stream, in particular for the treatment of a natural gas stream, comprising a first absorber for separating hydrogen sulfide out of the gas stream by means of an absorption medium, a combustion apparatus, following the first absorber, for the combustion of the gas stream purified of hydrogen sulfide, a second absorber, following the combustion apparatus, for separating carbon dioxide out of the exhaust gas of the combustion unit by means of an absorption medium, and at least one desorber for the desorption of separated hydrogen sulfide and of separated carbon dioxide out of the absorption medium. In this case, the first absorber and the second absorber are flow-connected to one another for the exchange of absorption medium.

Above all when an amino acid salt is used as an absorption medium, the second absorber is also set up for separating $SO_2/SO_x$ out of the exhaust gas of the combustion apparatus.

By the first absorber ($H_2S$ absorber) and the second absorber ($CO_2$ absorber) being flow-connected to one another, the absorption medium employed can be used both for removing hydrogen sulfide out of the crude natural gas stream before combustion (pre-combustion capture) and for removing the carbon dioxide out of the flue gas after the combustion of the natural gas (post-combustion capture).

Such a device for the treatment of a gas stream and, in particular, for the treatment of a natural gas stream thus makes it possible to carry out a method in which virtually complete retention of the carbon and sulfur load introduced by a natural gas stream is possible. Thus, the raw materials contained in hitherto scarcely used natural gas streams can be obtained, with undesirable emissions harmful to climate being largely avoided, can be utilized further and/or can be converted into desired products.

In an advantageous refinement of the invention, the first absorber comprises a delivery line and a discharge line for the absorption medium, the delivery line of the first absorber being flow-connected to a discharge line of the second absorber. It is thereby possible to exchange the absorption medium between the two absorbers which are employed for the respective removal of hydrogen sulfide and/or of carbon dioxide. In other words, the absorption medium can circulate between the two absorbers via the connection between the discharge line of the second absorber and the delivery line of the first absorber and can thus perform the desired separation task for the treatment of the natural gas.

Advantageously, further, the first absorber is flow-connected via its discharge line to the delivery line of a first desorber. In order to separate the components and to regenerate the absorption medium, the absorption medium laden with $H_2S$ and $CO_2$ is conducted, along with a rise in temperature, into the desorber where separation conventionally takes place thermally. Both the absorbed $CO_2$ and the absorbed $H_2S$ are desorbed and expelled by the supply of heat. In other words, the first desorber constitutes a common desorber for $H_2S$ and for $CO_2$.

Expediently, the first desorber is flow-connected to the delivery line of the second absorber via a recirculation line. Thus, the absorption medium regenerated in the desorber can be delivered to the second absorber and is available there once again for the absorption of carbon dioxide and further, after leaving the second absorber, also for the absorption of hydrogen sulfide in the first absorber.

When the laden absorption medium is being delivered to the first desorber, it is expediently pumped there by means of a pump, the laden absorption medium passing through a heat exchanger. In the heat exchanger, the heat of the regenerated absorption medium flowing from the first desorber to the second absorber is transferred to the laden absorption medium flowing out of the first absorber. The heat exchanger thus utilizes the waste heat in the recirculation line of the first desorber in order to preheat the absorption medium from the first absorber before entry into the desorber.

Advantageously, the first desorber has connected to it a discharge line which issues in a treatment apparatus. The treatment apparatus serves for treating the desorbed components and for converting them into further products. For example, the remaining $CO_2$-rich gas stream may be compressed in order to allow transport to a storage depot. Elementary sulfur may be produced from the hydrogen sulfide by reaction with oxygen, for example, by means of what is known as the Claus process or in a corresponding Claus plant.

In a further-advantageous refinement, a branch line is connected to the discharge line of the second absorber and is flow-connected to the delivery line of a second desorber. In such a refinement, only part of the absorption medium laden with $CO_2$ is delivered to the first absorber from the absorber sump of the second absorber via the discharge line. That part of the $CO_2$-laden absorption medium which flows via the branch line is delivered directly to the second desorber via the branch line.

The absorption medium delivered to the first absorber can be used there, as described above, for the absorption of hydrogen sulfide from a natural gas stream, and can finally be delivered to the first desorber for regeneration. The absorption medium delivered via the branch line to the second desorber is likewise regenerated there. In such a refinement, the absorption medium has to be purified only of $CO_2$ in the second desorber, since the absorption medium flowing via the branch line does not become laden with $H_2S$. Expediently, in a device with two desorbers, both desorbers are connected, in particular, to a corresponding treatment apparatus for treating the desorbed components and for converting them into further products.

Advantageously, a reboiler is connected to the first desorber and/or to the second desorber. The reboiler, as what is known as a sump evaporator, supplies the necessary regeneration heat for separating absorbed $CO_2$ and $H_2S$ from the absorption medium. The laden absorption medium is in this case regenerated by steam which is generated in the reboiler. To generate the steam inside the reboiler, the latter is conventionally heated by imported steam, for example from a connected steam power plant.

Advantageously, further, the first desorber and the second desorber are coupled thermally to one another. Coupling in this case takes place via a heat exchanger. For this purpose, the heat exchanger is incorporated in the discharge line of the first desorber and serves for heating the reboiler of the second desorber. In other words, the heat exchanger is incorporated into the reboiler circuit of the second desorber. The reboiler of the second desorber is therefore not heated by imported steam, but instead advantageously utilizes the waste heat of the first desorber.

Expediently, the combustion apparatus is a gas turbine. In the gas turbine, the natural gas purified as far as possible of hydrogen sulfide is burnt, and the flue gas occurring during combustion is transferred to the second absorber for the absorption of contained carbon dioxide and, if appropriate, of $SO_2/SO_x$.

Further, a heat recovery apparatus is arranged between the combustion apparatus and the second absorber. The flue gas occurring during combustion, before being introduced into the $CO_2$ absorber, is conducted for cooling through this heat recovery apparatus in order to promote absorption in the absorber.

Further advantageous refinements of the device may be gathered from the subclaims directed at the method. The advantages mentioned in this respect may be transferred accordingly to the device.

BRIEF DESCRIPTION OF THE DRAWINGS

Exemplary embodiments of the invention are explained below by means of a drawing in which.

DETAILED DESCRIPTION OF INVENTION

Figure 1:
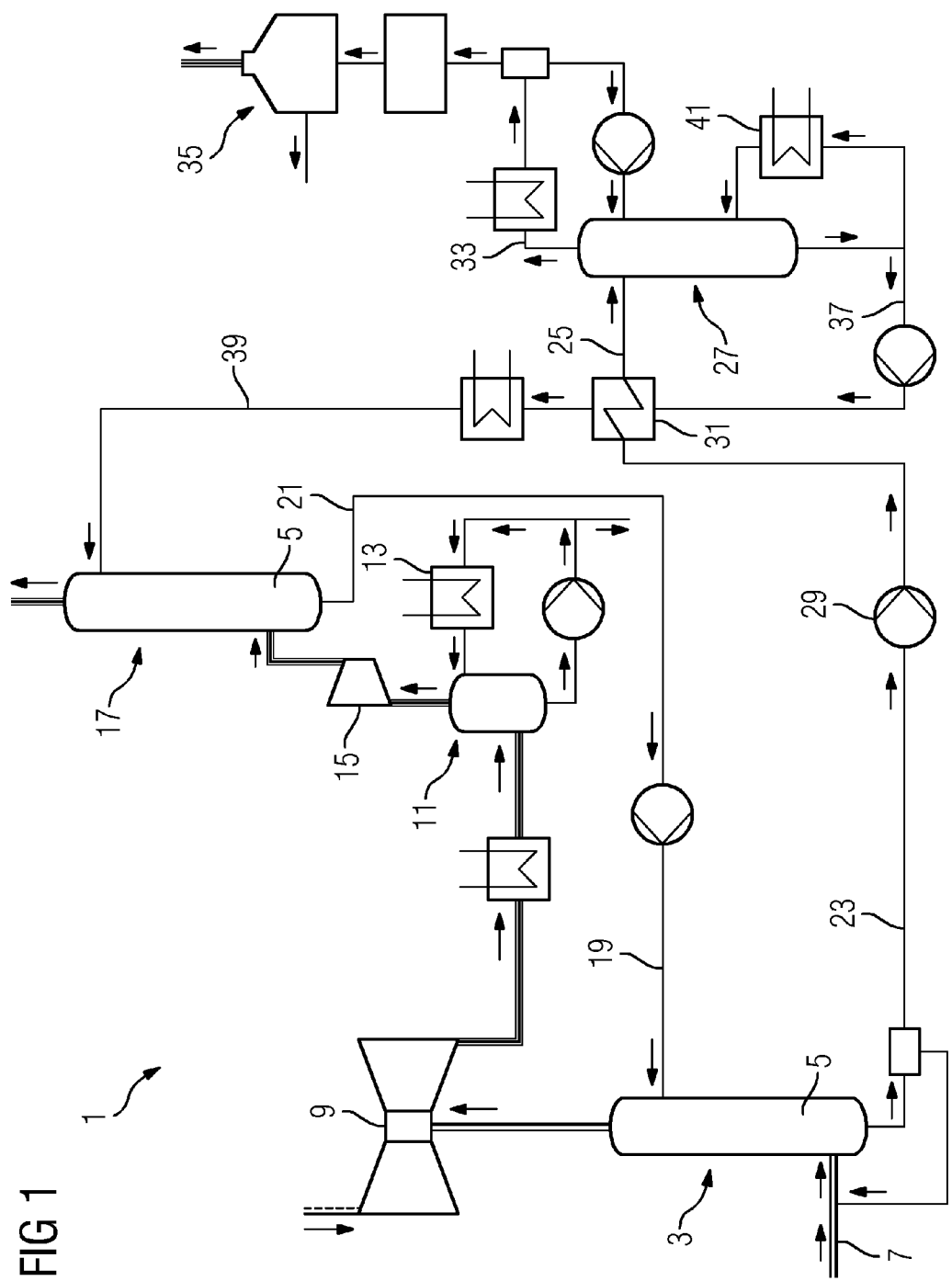
FIG. 1 shows a device for the treatment of a natural gas stream with two flow-connected absorbers and with a desorber.

FIG. 1 shows a device 1 for the treatment of a natural gas stream (EG) by the absorption of hydrogen sulfide ($H_2S$) and of carbon dioxide ($CO_2$). The device 1 comprises a first absorber 3 designed as an $H_2S$ absorber and having an absorption medium 5 for the separation of hydrogen sulfide out of the natural gas stream.

The crude natural gas stream flows via a delivery line 7 to the first absorber 3 and comes into contact there with the absorption medium 5. The absorption medium 5 used is an aqueous amine solution in which the hydrogen sulfide contained in the natural gas stream is absorbed.

The natural gas stream, as far as possible purified of $H_2S$, is then delivered from the first absorber 3 to a following combustion apparatus 9 designed as a gas turbine. In the gas turbine 9, the natural gas stream is burnt, and the resulting flue gas (RG) is subsequently delivered to a heat recovery apparatus 11 having a flue gas cooler 13. The flue gas cooler 13 in this case precools the flue gas arising from combustion in the gas turbine 9 for absorption purposes. The flue gas is streamed into a second absorber 17 via a blower 15 following the flue gas cooler 13.

The second absorber 17 is designed as a $CO_2$ absorber and serves correspondingly for separating the carbon dioxide contained in the flue gas. For this purpose, after combustion in the second absorber 17, the flue gas is likewise brought into contact with the absorption medium 5 and absorbs the $CO_2$ contained in the flue gas.

The absorption medium 5 employed thus serves equally for absorbing hydrogen sulfide out of the natural gas stream before combustion (pre-combustion capture) and for absorbing carbon dioxide from the flue gas after combustion (post-combustion capture). The first absorber 3 and the second absorber 17 are correspondingly flow-connected to one another for the exchange of the absorption medium 5.

Connection is made possible in that the first absorber 3 comprises for the absorption medium 5 a delivery line 19 which is connected to a discharge line 21 of the second absorber 17. The exchange of the absorption medium 5 between the two absorbers 3, 17 thereby becomes possible.

The absorption medium 5 in this case performs both separation tasks, that is to say it is suitable for separating the hydrogen sulfide in the first absorber 3 out of the natural gas before combustion and for likewise separating the carbon dioxide out of the flue gas in the second absorber 17 after combustion.

Furthermore, the first absorber 3 comprises a discharge line 23. The first absorber 3 is flow-connected to the delivery line 25 of a desorber 27 via this discharge line 23. The absorption medium 5 laden with $H_2S$ and $CO_2$ is pumped via these two lines 23, 25 into the desorber 27 by means of a pump 29, along with a rise in temperature, for regeneration.

In this case, the laden absorption medium 5 passes through a heat exchanger 31 in which the heat of the regenerated absorption medium 5 flowing from the desorber 27 to the second absorber 17 is transferred to the laden absorption medium 5 delivered by the first absorber 3. The heat exchanger 31 in this case utilizes the waste heat of the first desorber 27 in order to preheat the absorption medium 5 from the first absorber 3 before entry into the desorber 27.

Within the desorber 27, the $CO_2$ absorbed in the absorption medium 5 and the absorbed $H_2S$ are desorbed thermally. For the treatment and transfer of the desorbed components, a discharge line 33 is connected to the first desorber 27 and issues in a treatment apparatus 35. In the treatment apparatus 35, which is designed as a Claus plant, sulfur is produced by reaction with oxygen. The desorbed $CO_2$-rich gas stream may be compressed in order to allow transport to a storage depot. The desorber 27 is thus configured as a common desorber for $H_2S$ and for $CO_2$.

Furthermore, a recirculation line 37 is connected to the first desorber 27. The recirculation line 37 is flow-connected to the delivery line 39 of the second absorber 17. The absorption medium 5 regenerated in the desorber 27 is recirculated into the second absorber 17 via the flow connection between the recirculation line 37 and the delivery line 39 and is available there for the renewed absorption of $CO_2$ from the flue gas and, further, also for the absorption of $H_2S$ from the crude natural gas stream in the first absorber 3.

Furthermore, the desorber 27 has connected to it a reboiler 41 which supplies the necessary regeneration heat for separating $CO_2$ and $H_2S$ from the absorption medium 5. The laden absorption medium 5 is in this case regenerated by steam which is generated in the reboiler 41. The reboiler 41 is heated by imported heat, for example from a connected steam power plant, although this is not shown in the present case.

Figure 2:
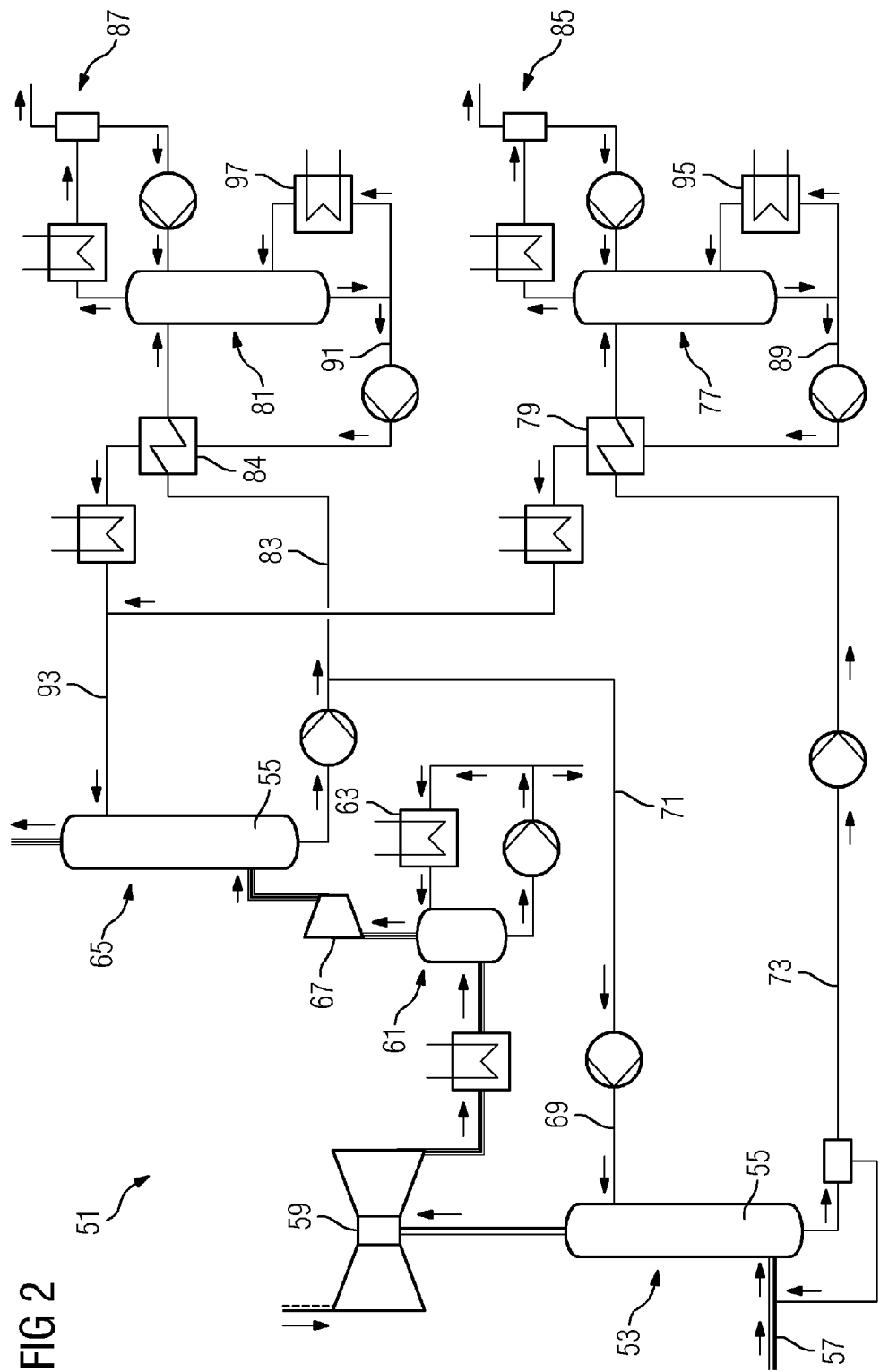
FIG. 2 shows a further device for the treatment of a natural gas stream with two flow-connected absorbers and with two separate desorbers.

FIG. 2 shows a further device 51 for the treatment of a natural gas stream (EG) by the absorption of hydrogen sulfide ($H_2S$) and of carbon dioxide ($CO_2$). Like the device 1 according to FIG. 1, the device 51 comprises a first absorber 53 designed as an $H_2S$ absorber and having an absorption medium 55 for separating the hydrogen sulfide out of the natural gas stream.

For this purpose, the natural gas is delivered to the first absorber 53 via a delivery line 57 and comes into contact there with the absorption medium 55. The absorption medium 55 used is an aqueous amino acid salt solution.

The hydrogen sulfide contained in the natural gas is removed in the first absorber 55 by absorption, and the purified natural gas stream is then delivered to a following combustion apparatus 59 designed as a gas turbine. In the gas turbine 59, the natural gas stream is burnt, and the flue gas (RG) occurring during combustion is delivered to a heat recovery apparatus 61. The heat recovery apparatus 61 comprises a flue gas cooler 63 which precools the flue gas for absorption in a second absorber 65. The flue gas is blown into the second absorber 65 via a blower 67 following the flue gas cooler 63.

The second absorber 65 serves for separating the carbon dioxide contained in the flue gas. For this purpose, the flue gas is brought into contact with the absorption medium 55 in the second absorber 65, and the $CO_2$ contained in the flue gas is absorbed by the absorption medium 55. Here, too, the absorption medium 55 serves likewise for absorbing the hydrogen sulfide from the natural gas stream before combustion and for absorbing the carbon dioxide from the flue gas after combustion. Correspondingly, the first absorber 53 and the second absorber 65 are flow-connected to one another for the exchange of the absorption medium 55.

The flow connection is ensured in that the delivery line 69 of the first absorber 53 is connected to a discharge line 71 of the second absorber 65. The exchange of the absorption medium 55 between the two absorbers 53, 65 can thus take place.

In addition to the delivery line 69, the first absorber 53 comprises a discharge line 73 which is flow-connected to the delivery line 75 of a first desorber 77. Laden absorption medium 55 can flow out of the first absorber 53 via the discharge line 73 and, after passing through a heat exchanger 79, into the first desorber 77 and can be regenerated there.

In contrast to the device 1 according to FIG. 1, however, the first desorber 77 is used essentially for the desorption of hydrogen sulfide out of the absorption medium 55. The carbon dioxide absorbed in the absorption medium 55 is desorbed in a separate second desorber 81. In order to ensure that essentially the hydrogen sulfide is desorbed in the first desorber 77 and essentially the carbon dioxide is desorbed in the second desorber 81, the desorption conditions within the respective desorbers 77, 81 are selected correspondingly. This may be achieved, in particular, by the targeted choice of the absorption medium 55 and/or the temperature within the respective desorber 77, 81.

In order to allow desorption of $H_2S$ and $CO_2$ in two separate desorbers, the discharge line 71 of the second absorber 65 has connected to it a branch line 83, via which the second absorber 65 is flow-connected to the second desorber 81.

Part of the $CO_2$-laden absorption medium 55 is delivered from the absorber sump of the second absorber 65, and via its discharge line 71, to the first absorber 53. The absorption medium 55 is used there for the absorption of hydrogen sulfide and is finally delivered to the first desorber 77 for regeneration. The first desorber 77 is thus designed essentially as an $H_2S$ absorber.

Another part of the absorption medium 55 flows through the branch line 83 to the second desorber 81. In this case, the absorption medium 55 likewise passes through a heat exchanger 84 in which the heat of the regenerated absorption medium 55 flowing from the desorber 81 to the second absorber 65 is transferred to the laden absorption medium 55 delivered by the second absorber 65.

Since the absorption medium 55 flowing to the second desorber 81 is laden essentially only with $CO_2$, the second desorber 81 is designed essentially as a $CO_2$ absorber. In the present case, the two desorbers 77, 81 are each designed with a treatment apparatus 85, 87 for the further use and/or storage of the desorbed components.

For the further use of the regenerated absorption medium 55, the two desorbers 77, 81 are each provided with a recirculation line 89, 91. The two recirculation lines 89, 91 are flow-connected to the delivery line 93 of the second absorber 65, so that the regenerated absorption medium 55 can be delivered from the two desorbers 77, 81 to the second absorber 65 for further use.

In addition, the two desorbers 77, 81 are each provided with a reboiler 95, 97 which supplies the necessary regeneration heat for separating $CO_2$ and $H_2S$ from the absorption medium 55. The laden absorption medium 55 is in this case regenerated by steam which is generated in the respective reboilers 95, 97.

Figure 3:
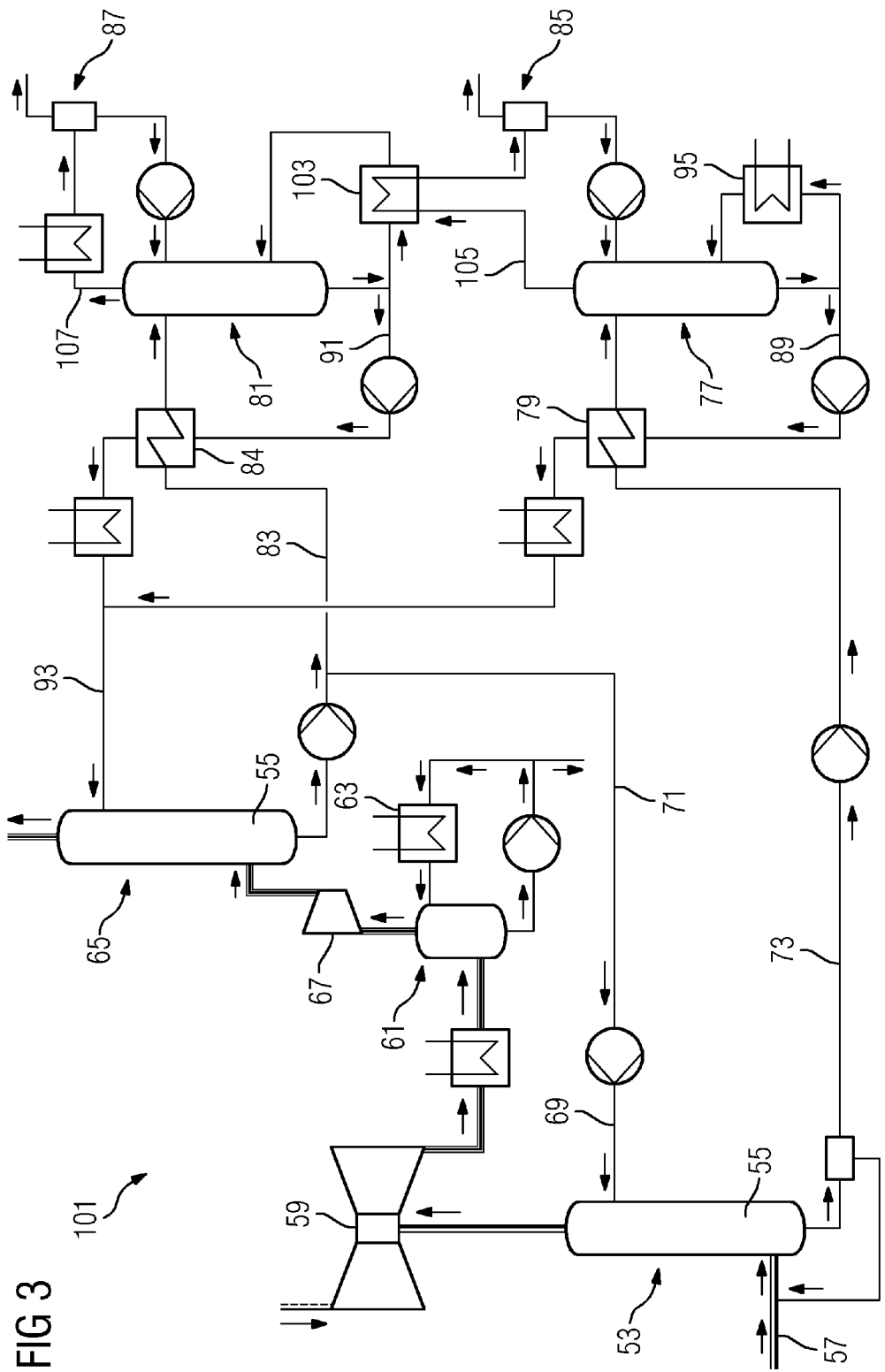
FIG. 3 shows a further device for the treatment of a natural gas stream with two flow-connected absorbers and with two thermally coupled desorbers.

FIG. 3 shows a further device 101 which serves for the treatment of a natural gas stream (EG) by the absorption of hydrogen sulfide ($H_2S$) and of carbon dioxide ($CO_2$). Since the device 101 corresponds essentially to the device 51 according to FIG. 2, the respective components of the device 101 are given the same reference symbols as the components of the device 51. The detailed description of the device 51 may also be transferred accordingly to the device 101 according to FIG. 3.

The difference between the device 101 and the device 51 according to FIG. 2 is the thermal coupling of the two desorbers 77, 81. Coupling between the first desorber 77 and the second desorber 81 takes place via a heat exchanger 103. The heat exchanger 103 is incorporated in the discharge line 105 of the first desorber 77 and serves for heating the reboiler 97 of the second desorber 81. The reboiler 97 is therefore in this case not heated by imported steam, but instead uses the waste heat of the first desorber 77.

Overall, all the devices 1, 51, 101 according to FIGS. 1, 2 and 3 and the methods which can be carried out by means of these devices 1, 51, 101 afford the possibility of obtaining at low cost and at a low outlay in terms of process technology raw materials contained in hitherto scarcely utilized natural gas streams, with undesirable emissions harmful to climate being largely avoided, and of processing these raw materials further, depending on the application.

Furthermore, the use of the same absorption medium 5, 55 for the absorption both of $H_2S$ before combustion (precombustion capture) and of $CO_2$ after combustion (post-combustion capture) makes it possible to have cost-effective operation at a low outlay in terms of process technology.

The invention claimed is:

1. A method for the treatment of a gas stream, the method comprising:
    before the combustion of the gas stream, separating out hydrogen sulfide from the gas stream in a first absorber by an absorption medium,
    burning the treated gas stream purified of hydrogen sulfide in a combustion apparatus,
    separating carbon dioxide contained in the exhaust gas of the burnt gas stream in a second absorber by the absorption medium, and
    separating the separated hydrogen sulfide and the separated carbon dioxide from the absorption medium in at least one desorber for the regeneration of the absorption medium,
    wherein the same absorption medium is used for separating the hydrogen sulfide out of the gas stream and for separating the carbon dioxide out of the exhaust gas, the absorption medium containing dioxide flowing out of the second absorber via a discharge line of the second absorber directly into a delivery line of the first absorber.

2. The method as claimed in claim 1,
    wherein an amine-containing absorption medium is used.

3. The method as claimed in claim 1,
    wherein an amino acid salt is used as the absorption medium.

4. The method as claimed in claim 1,
wherein the desorption of the hydrogen sulfide and the desorption of the carbon dioxide out of the absorption medium takes place in a common desorber.

5. The method as claimed in claim 1,
wherein the desorption of the hydrogen sulfide and the desorption of the carbon dioxide out of the absorption medium takes place in each case in a separate desorber.

6. The method as claimed in claim 1,
wherein the gas stream comprises a natural gas stream.

7. A device for the treatment of a gas stream, comprising:
a first absorber for separating hydrogen sulfide out of the gas stream by an absorption medium,
a combustion apparatus, following the first absorber, for the combustion of the gas stream purified of hydrogen sulfide,
a second absorber, following the combustion apparatus, for separating carbon dioxide out of the exhaust gas of the combustion apparatus by the absorption medium, and
at least one desorber for the desorption of separated hydrogen sulfide and of separated carbon dioxide out of the absorption medium,
wherein the first absorber comprises a delivery line and a discharge line for the absorption medium, and the delivery line of the first absorber is flow-connected to a discharge line of the second absorber for the exchange of the absorption medium.

8. The device as claimed in claim 7,
wherein the first absorber is flow-connected via its discharge line to the delivery line of a first desorber.

9. The device as claimed in claim 8,
wherein the first desorber is flow-connected to the delivery line of the second absorber via a recirculation line.

10. The device as claimed in claim 8,
wherein the first desorber has connected to it a discharge line which issues in a treatment apparatus.

11. The device as claimed in claim 7, further comprising:
a branch line connected to the discharge line of the second absorber and flow-connected to the delivery line of a second desorber.

12. The device as claimed in claim 11, further comprising:
a reboiler connected to the first desorber and/or to the second desorber.

13. The device as claimed in claim 11,
wherein the first desorber and the second desorber are coupled thermally to one another.

14. The device as claimed in claim 7,
wherein the combustion apparatus comprises a gas turbine.

15. The device as claimed in claim 7, further comprising:
a heat recovery apparatus arranged between the combustion apparatus and the second absorber.

16. The device as claimed in claim 7,
wherein the gas stream comprises a natural gas stream.

* * * * *